(12) United States Patent
Romano

(10) Patent No.: US 11,741,133 B1
(45) Date of Patent: Aug. 29, 2023

(54) SYSTEM AND METHOD FOR INFORMATION MANAGEMENT

(71) Applicant: Drainpipe Foundation LLC, Port Orange, FL (US)

(72) Inventor: Dominick Romano, Port Orange, FL (US)

(*) Notice: Subject to any disclaimer, the term of this patent is extended or adjusted under 35 U.S.C. 154(b) by 0 days.

(21) Appl. No.: 17/492,546

(22) Filed: Oct. 1, 2021

Related U.S. Application Data

(60) Provisional application No. 63/086,138, filed on Oct. 1, 2020.

(51) Int. Cl.
| | |
|---|---|
| G06F 16/20 | (2019.01) |
| G06F 16/28 | (2019.01) |
| G06F 16/242 | (2019.01) |
| G06F 16/22 | (2019.01) |

(52) U.S. Cl.
CPC ........... *G06F 16/287* (2019.01); *G06F 16/22* (2019.01); *G06F 16/2423* (2019.01)

(58) Field of Classification Search
CPC ..... G06F 16/287; G06F 16/22; G06F 16/2423
See application file for complete search history.

(56) References Cited

U.S. PATENT DOCUMENTS

| | | | | |
|---|---|---|---|---|
| 5,768,580 | A * | 6/1998 | Wical | G06F 40/237 707/999.102 |
| 8,326,819 | B2 * | 12/2012 | Indeck | G06F 16/22 707/711 |
| 10,181,100 | B1 * | 1/2019 | Benvenuto | G06N 3/006 |
| 2009/0070103 | A1 * | 3/2009 | Beggelman | G06F 40/20 704/9 |
| 2019/0156558 | A1 * | 5/2019 | Neeter | G06T 17/00 |
| 2020/0174966 | A1 * | 6/2020 | Szczepanik | G06F 16/13 |

* cited by examiner

*Primary Examiner* — Tarek Chbouki
(74) *Attorney, Agent, or Firm* — Patent GC LLC; Alexander Franco

(57) ABSTRACT

A system and associated methods can be configured to attribute meaning to elements of input information. In one embodiment, the system can map each input datapoint from an incoming stream of data to classes represented in a hierarchical ontology. The ontology can be displayed in a user interface through which a user can make modifications to the ontology, including associating input datapoints with newly defined classes within the ontology's hierarchy. The new associations can then be used to train a statistical model, which in turn can then be used to classify yet additional incoming data. The system can include a control unit and one or more processing units to which the control unit delegates processing tasks. The control unit can also serve as a user/input/output interface. The mapping can be done in real-time using a low latency process.

20 Claims, 13 Drawing Sheets

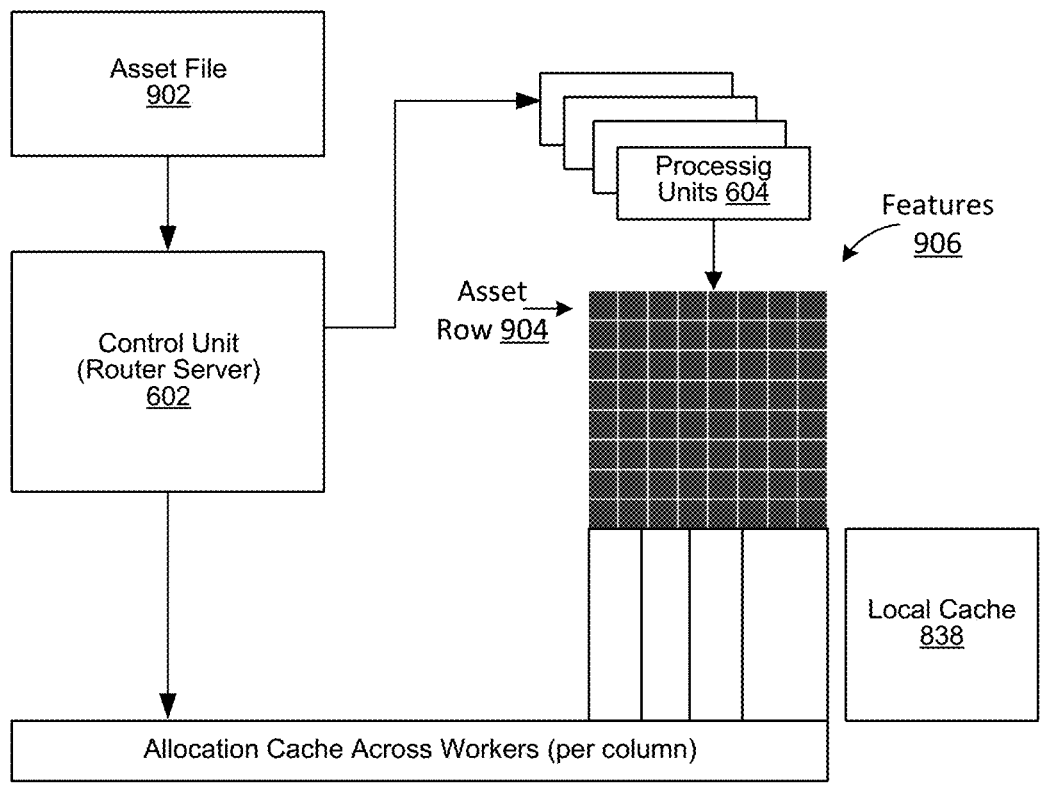

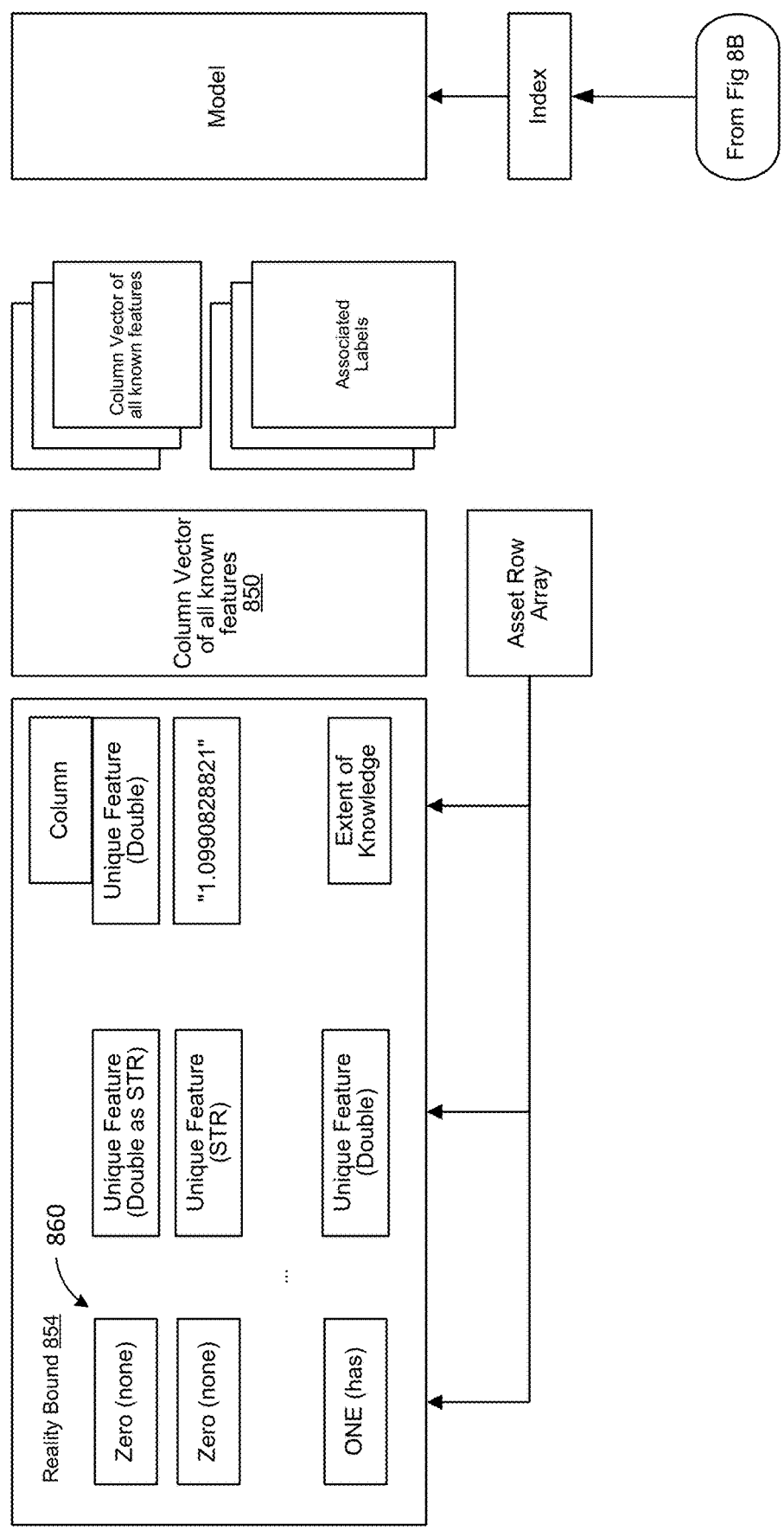

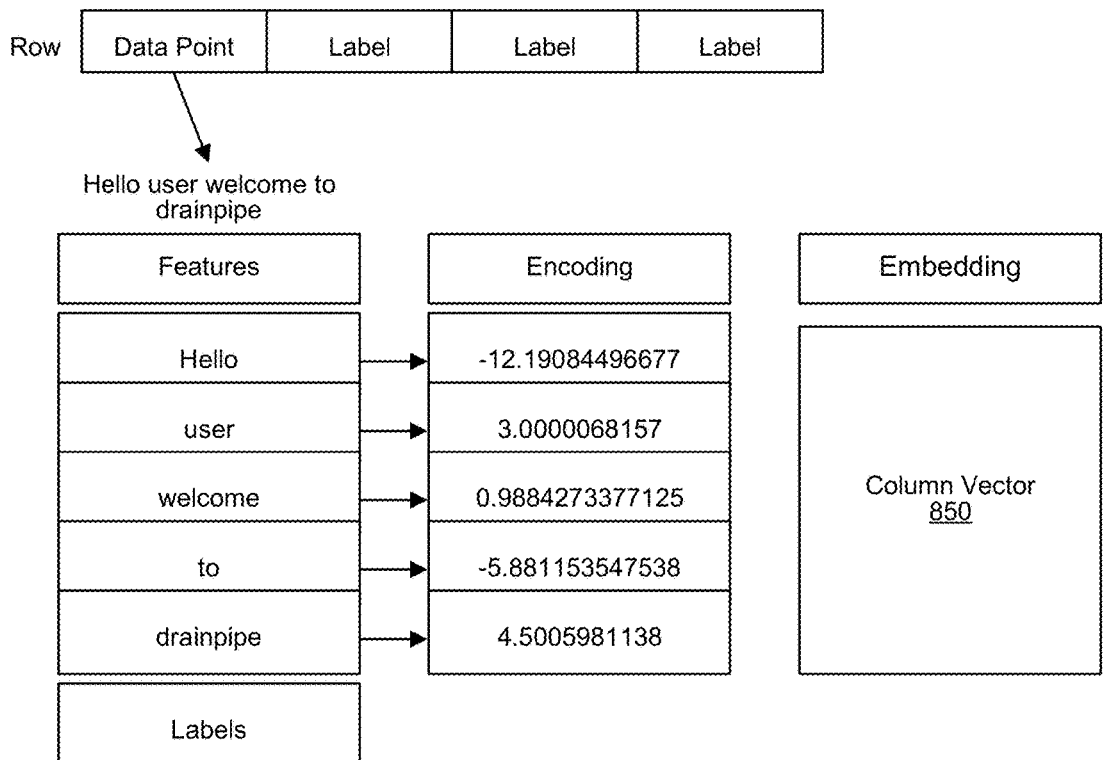
FIG. 10
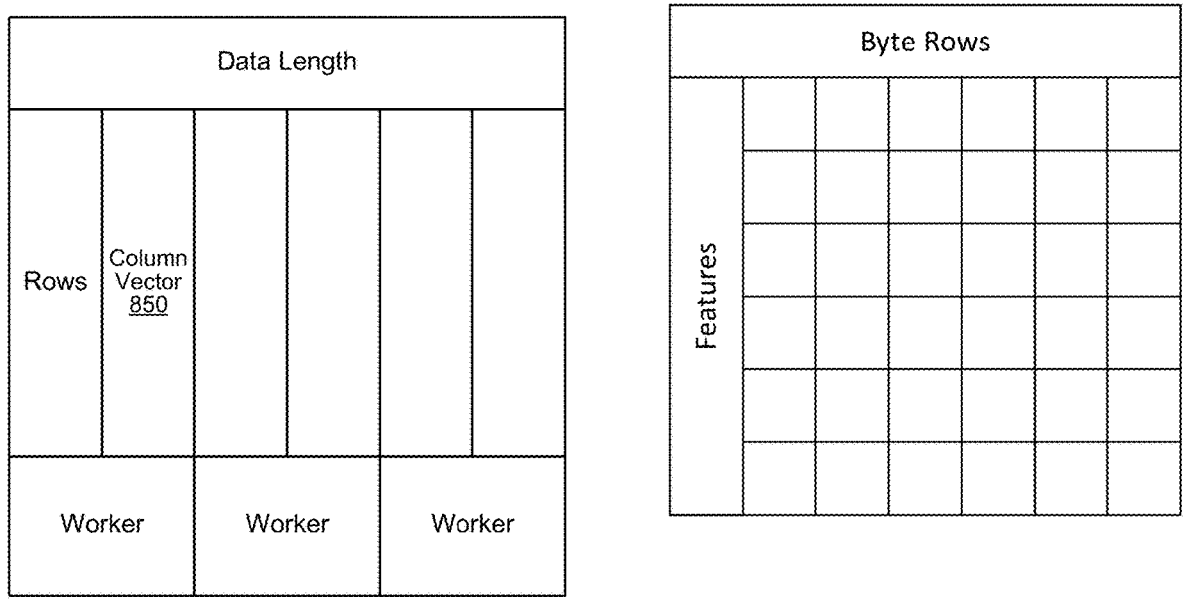
FIG. 11
FIG. 12

SYSTEM AND METHOD FOR INFORMATION MANAGEMENT

RELATED APPLICATIONS

The subject matter of this application is related to U.S. Provisional Application No. 63/086,138, filed on 2020 Oct., 01, which is hereby incorporated by reference in its entirety.

BACKGROUND OF THE INVENTION

In the world of information technology, the creation and storage of information is increasing exponentially. Every year humanity consumes and stores more data than ever before. Accordingly, the systems which manage this data and associated information must continually consume and process more data than ever before. The increase in data is further amplified through artificial intelligence and machine learning which generate data even without continuous user input. While artificial intelligence has the potential to be an incredibly powerful tool, such power has to be structured and managed properly due to the simplistic nature of artificial intelligence. It is quite possible today for developers to build an artificial intelligence system and lose track of what it actually knows, which could be incredibly dangerous and destructive.

With an ever growing demand for data processing speed, throughput and retention, there is a need for a platform which can ingest any kind of data, structured or unstructured, and make it actionable to advance humanity, aid frictionless living, and drive intelligent business and technology of tomorrow.

SUMMARY OF THE INVENTION

This disclosure relates to information management. More particularly, the disclosure relates to systems and methods configured to ingest structured and unstructured content from any source, analyze for changes and anomalies in real time, learn and enhance existing data sets, or deploy a series of workflows using machine learning algorithms across any data set.

A system and associated methods can be configured to attribute meaning to elements of input information. In one embodiment, the system can map each input datapoint from an incoming stream of data to classes represented in a hierarchical ontology. The ontology can be displayed in a user interface through which a user can make modifications to the ontology, including associating input datapoints with newly defined classes within the ontology's hierarchy. The new associations can then be used to train a statistical model, which in turn can then be used to classify yet additional incoming data. The system can include a control unit and one or more processing units to which the control unit delegates processing tasks. The control unit can also serve as a user/input/output interface. The mapping can be done in real-time using a low latency process.

A method can be performed by a computer system having at least one processor and a memory. The method can include: maintaining in the memory a hierarchical ontology of classes for classifying input data; receiving a first asset file of data to be classified into the ontology; breaking down the first asset file into a first plurality of asset rows; for each asset row of the first plurality of asset rows: extracting one or more features from the asset row, encoding each of the one or more features, and embedding each encoded feature with a generational time stamp; displaying one or more of the features extracted from the first plurality of rows as artifacts within at least a portion of the ontology in a hierarchical representation in a graphical user interface; in response to user input received through the graphical user interface, modifying the ontology by adding a new class and associating one or more of the artifacts with the new class; executing a train task to train a statistical model based on the embedded encoded features extracted from the first plurality of rows, the modified ontology, and the association of the one or more of the artifacts with the new class; receiving a second asset file of data to be classified into the ontology; breaking down the second asset file into a second plurality of asset rows; for each asset row of the second plurality of asset rows: extracting one or more features from the asset row, encoding each of the one or more features, and embedding each encoded feature with a generational time stamp; and executing a predict task to apply the statistical model to associate embedded encoded features extracted from the second plurality of rows with classes in the modified ontology.

A method can be performed by a computer system having at least one processor and a memory. The method can include: receiving information data from a data input; breaking down the information data into one or more asset rows; for each asset row, identifying one or more features within the asset row; encoding each feature; embedding each encoded feature with a generational time stamp; comparing each embedded feature with one or more mapped labels; and associating a specific label to a feature when the embedded feature and the specific label match within a desired predictability.

A computer system can include the at least one processor and the memory, wherein the memory has instructions stored thereon that are executed by the at least one processor and cause the computer system to perform any of the foregoing methods.

A non-transitory computer readable medium can have instructions stored thereon, wherein the instructions are executed by the least one processor and cause the at least one processor to perform any of the foregoing methods.

As will be appreciated by one skilled in the art, multiple aspects described in this summary can be variously combined in different operable embodiments. All such operable combinations, though they may not be explicitly set forth in the interest of efficiency, are specifically contemplated by this disclosure.

BRIEF DESCRIPTION OF THE DRAWINGS

FIG. 7 illustrates a schematic of processing unit health and status data

FIGS. 8A-C illustrate a detailed architecture and information flow diagram in accordance with one embodiment of the system.

FIG. 9 illustrates a schematic showing the processing of an asset file during an asset row task in response to an asset row event.

FIG. 10 is a schematic illustration showing the processing of an example asset row to identify features during an asset row task.

FIG. 11 is a schematic illustration showing an embedded asset feature matrix.

FIG. 12 is a schematic view of a training matrix.

DETAILED DESCRIPTION

In the following description, references are made to various embodiments in accordance with which the disclosed subject matter can be practiced. Some embodiments may be described using the expressions one/an/another embodiment or the like, multiple instances of which do not necessarily refer to the same embodiment. Particular features, structures or characteristics associated with such instances can be combined in any suitable manner in various embodiments unless otherwise noted. By way of example, this disclosure may set out a set or list of a number of options or possibilities for an embodiment, and in such case, this disclosure specifically contemplates all clearly feasible combinations and/or permutations of items in the set or list.

Overview

A system and associated methods can be configured to attribute meaning to elements of input information. In one embodiment, the system can map each input datapoint from an incoming stream of data to classes represented in a hierarchical ontology. The ontology can be displayed in a user interface through which a user can make modifications to the ontology, including associating input datapoints with newly defined classes within the ontology's hierarchy. The new associations can then be used to train a statistical model, which in turn can then be used to classify yet additional incoming data. The system can include a control unit and one or more processing units to which the control unit delegates processing tasks. The control unit can also serve as a user/input/output interface. The mapping can be done in real-time using a low latency process.

User Interface

Figure 1A:
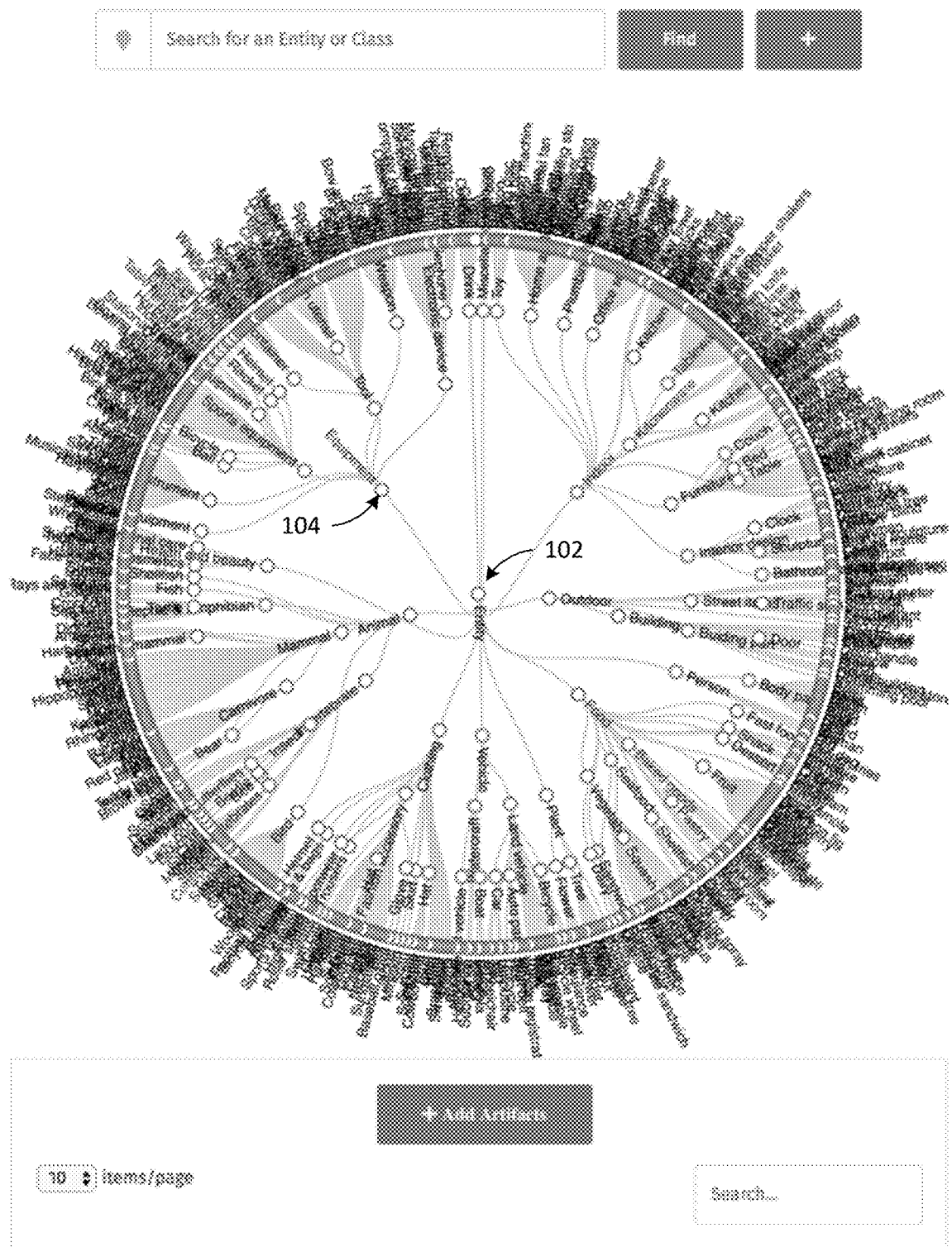
FIG. 1A illustrates a view of a system graphical user interface (GUI) that shows a portion of an example ontology in a "Discover & Add Classes" system interface.

FIG. 1A illustrates a view of a system graphical user interface (GUI) that shows a portion of an example ontology in a "Discover & Add Classes" system interface. The interface, as illustrated in FIG. 1A, can be configured to display a visual graph of an ontology topography which allows for managing classifications and training of the data. The ontology can be associated with a particular user or organization account on the system. Each ontology can include a top level class with one or more dependent child classes. As one example, the top level class in FIG. 1A is the "Entity" class 102, which is then broken down into multiple child classes, including the "Equipment" class 104, as shown fanning out around the central "Entity" class.

Figure 1B:
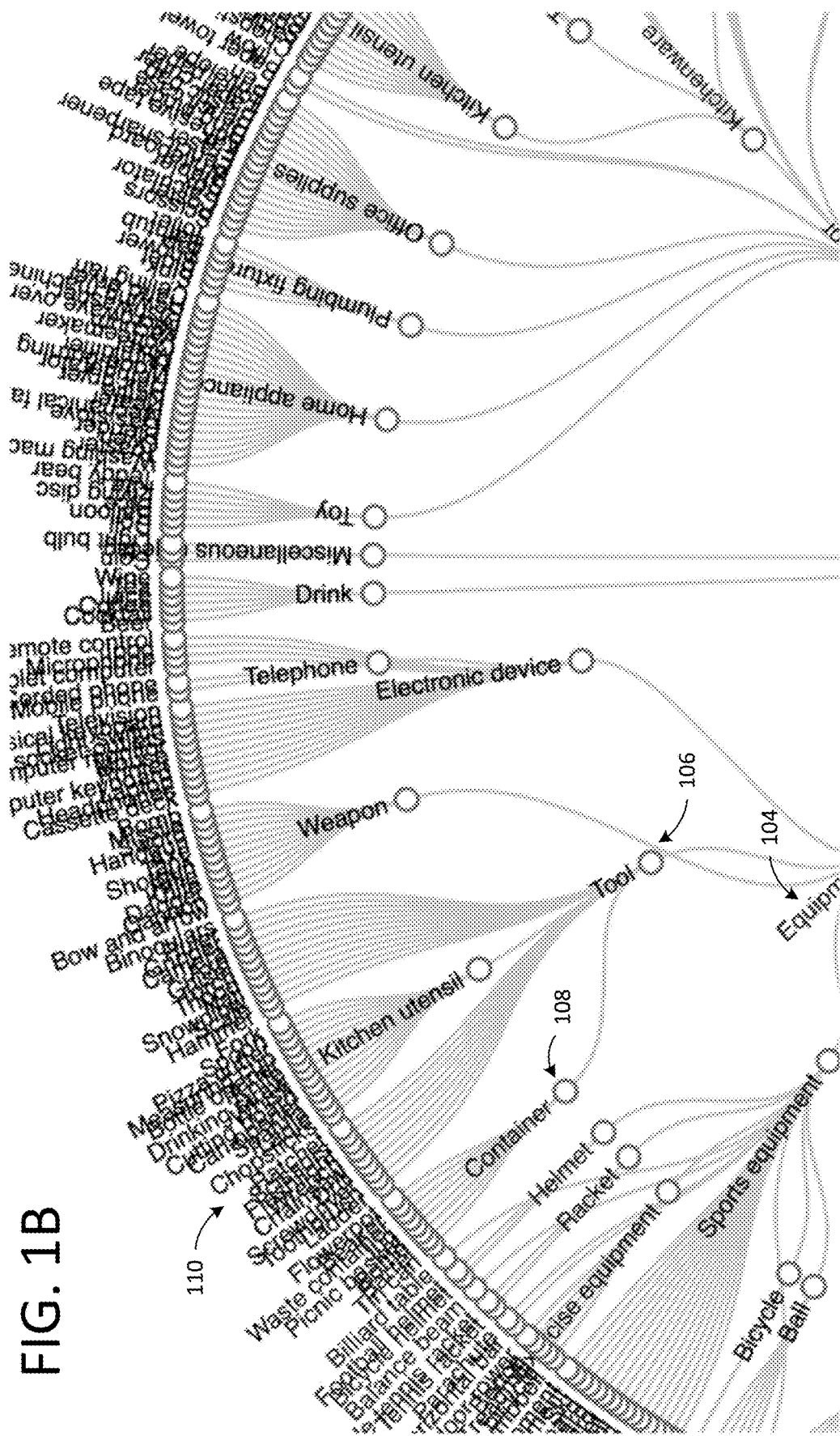
FIG. 1B, shows a zoomed in portion of FIG. 1A.

FIG. 1B, shows a zoomed in portion of FIG. 1A. As illustrated in FIG. 1B, each child class can be further broken down into additional child classes 106, 108 and 110. Looking at one child class 104 with the label "Equipment", it then breaks down into further classes including "Tool", which in turn may be broken down to more specific classes including "Container", "Kitchen Utensil" or "Weapon". At the outer ring of the illustrated ontology can be found specific classes 110 such as, "Flower Pot" under the parent class "Container". It is noted that some data may not fall within a sub-class and may be directly linked to a higher class, for example, the class "Racket" directly beneath the "Sports Equipment" class. The assignment of classes within an ontology can be based on a system which allows the manual (human taught) creation of ontologies as well as a confidence driven artificial intelligence creation of ontologies.

Figure 2:
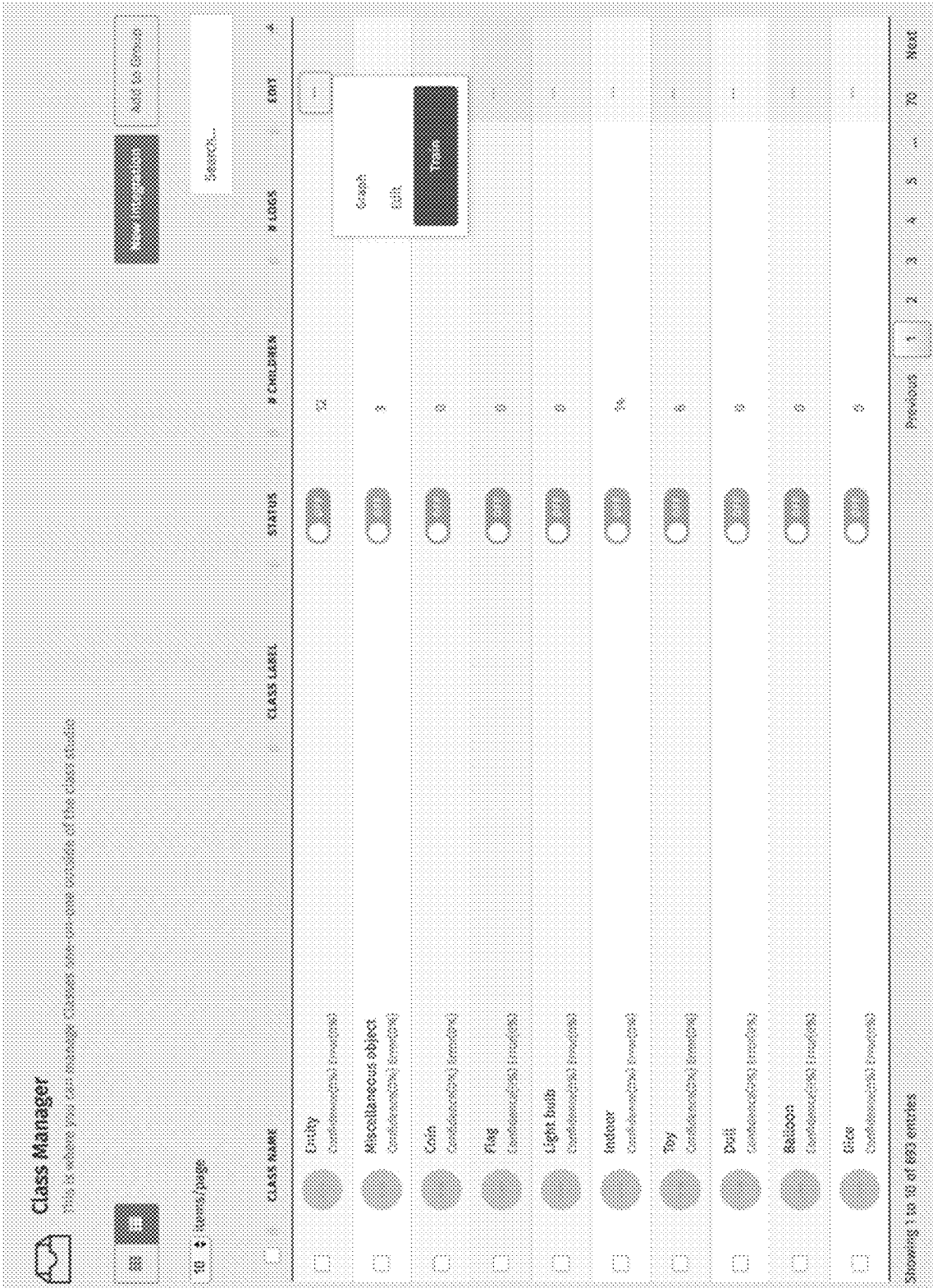
FIG. 2 illustrates a view of the system GUI that shows a "Class Manager" system interface.

FIG. 2 illustrates a view of the system GUI that shows a "Class Manager" system interface. The Class Manager interface can allow the user to see a list of classes and input options to view (e.g. to graph) or further define ontologies, for example, to edit or train selected ontologies. Editing allows for the direct manipulation of data associated with an ontology while training allows for the automated updating of data associated with an ontology as well as the creation of new ontologies.

The ontologies can be included as part of a classification system that can also utilize classes in macros used in artifacts and integrations which can be used to produce new machine-generated classes. As one example, a new type of asset may be generated as a new class, e.g. an image asset versus a text asset. The classification system can be configured to support classifying of underlying values, association of data sources & integrations, as well as associations to workflows and jobs.

Referring to FIGS. 1 to 2, the GUI can serve as a dashboard for the system with locations for data input and locations for data output. The GUI can facilitate all of the front end requirements for managing assets, data streams, visualizing data, alerting, administration of integrations and job/workflow management. The GUI can be understood as the rendering interface of the system.

Application of System

Figure 3:
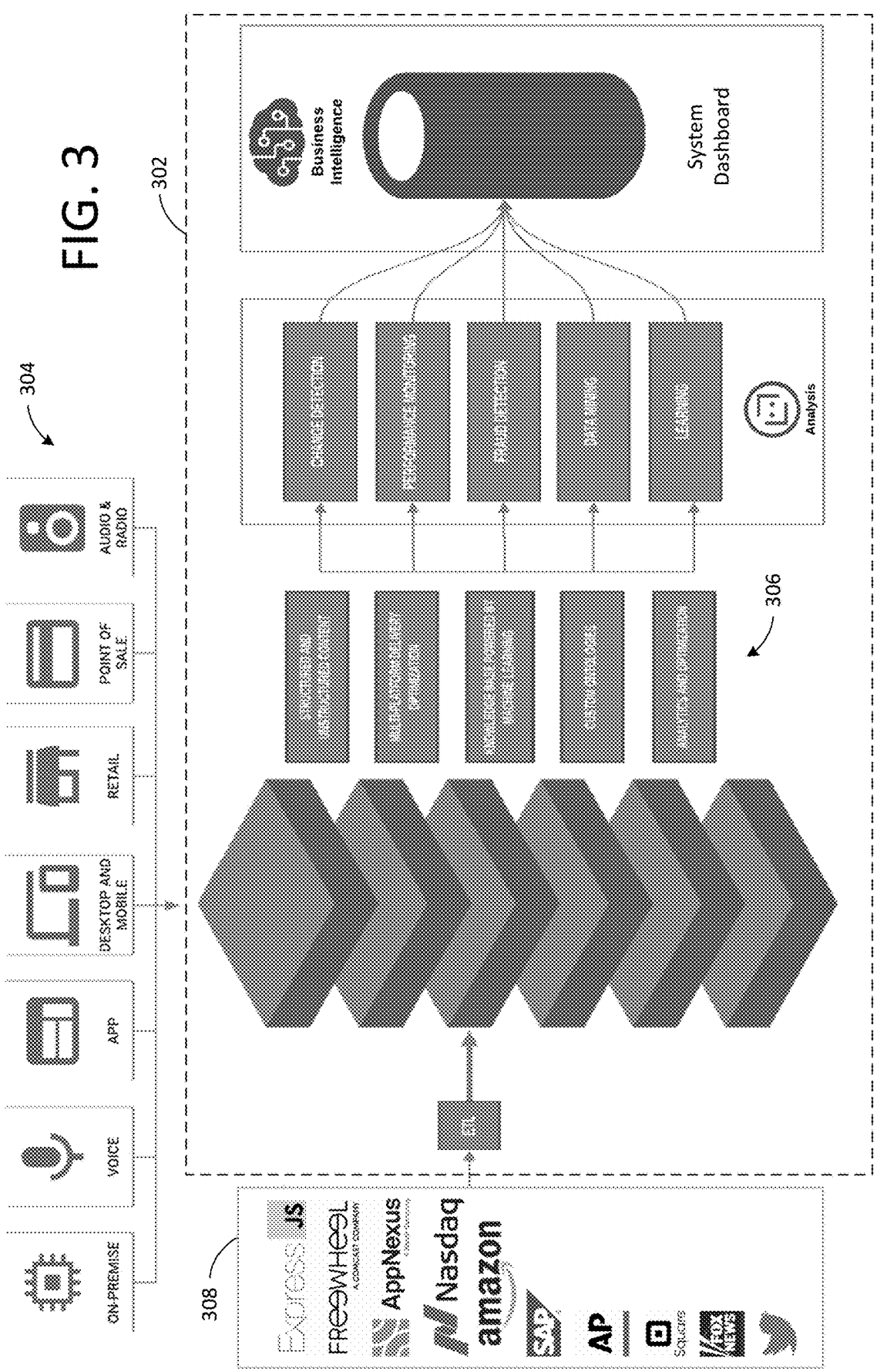
FIG. 3 illustrates various scenarios in which an embodiment of the system 302 can be applied.

FIG. 3 illustrates various scenarios in which an embodiment of the system 302 can be applied. The system may be in communication with various data inputs 304, including news sources, voice, desktop and mobile, retail, etc. The system continuously receives a live data feed 306 from the various inputs 308 and analyzes the data in real time.

Figure 4:
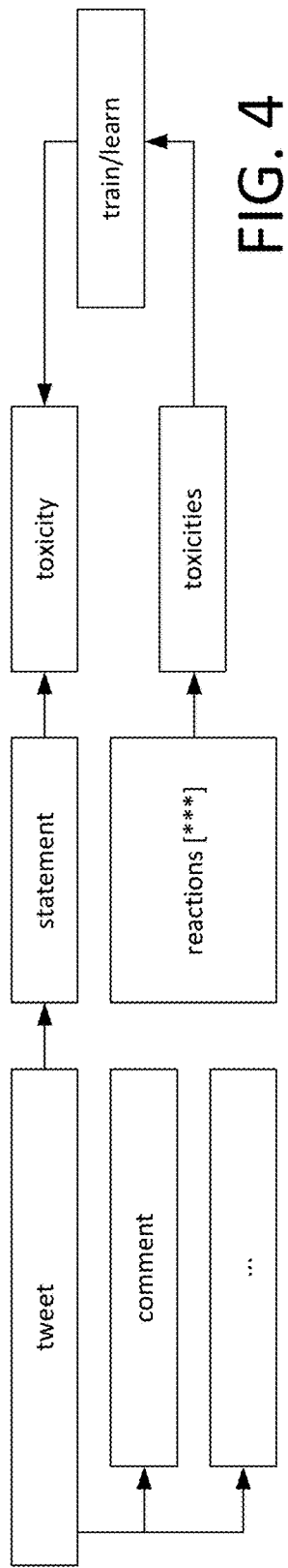
FIG. 4 illustrates an example analysis of for tweets received into the system.

FIG. 4 illustrates an example analysis of for tweets received into the system. Each tweet as well as comments and reactions are received by the system. The system breaks each of the tweets and associated comments into features and performs an automated analysis by comparing the features of the tweets and comments to a training model.

Figure 5:
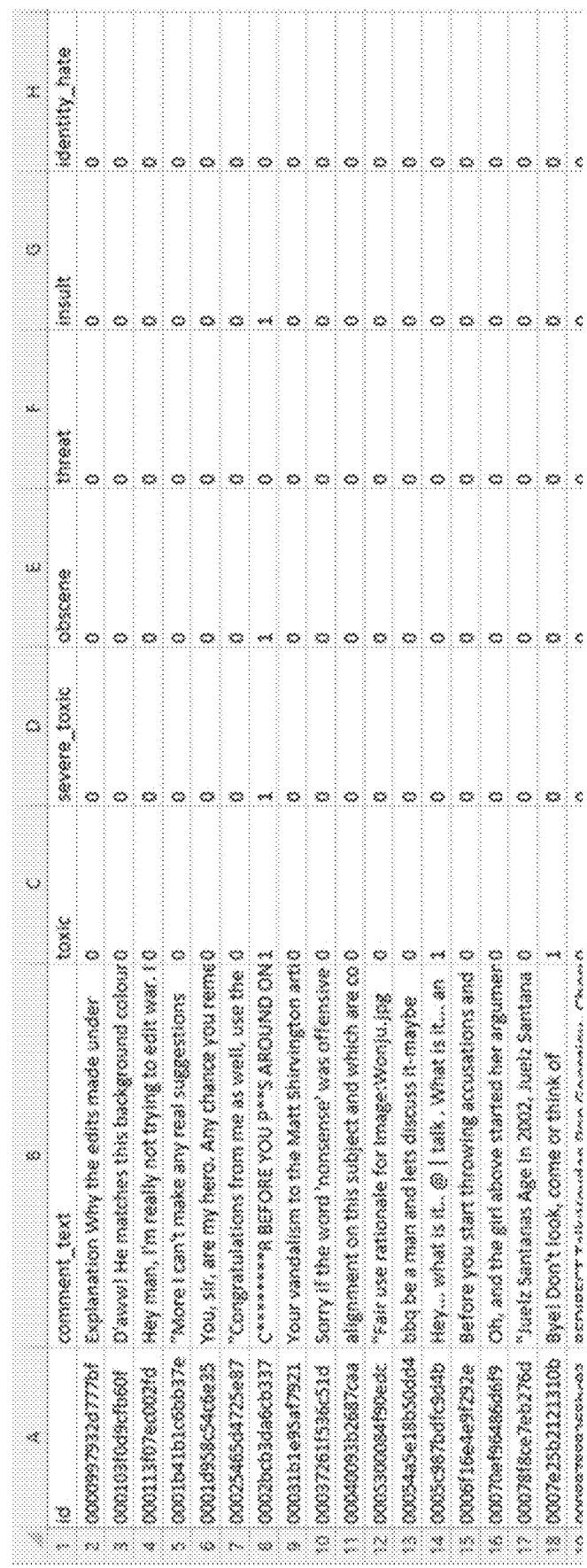
FIG. 5 illustrates an example output of the system for analysis of various tweet inputs.

FIG. 5 illustrates an example output of the system for analysis of various tweet inputs. In the illustrated example, the system is configured to identify whether a comment is toxic, severe toxic, obscene, a threat, an insult or identity hate. The example output, which can be delivered through the GUI, is in the form of a table with a 1 in each column where the comment of the row fits the category. Based on the output, an end user can identify which tweets and comments may need to be addressed.

For use of the obtained data, the system can include a robust statistics, reporting, and scripting suite. For example, the system may have support for LUA, and R based Data Science and Research Algorithms among other applications.

System Architecture Overview

Figure 6:
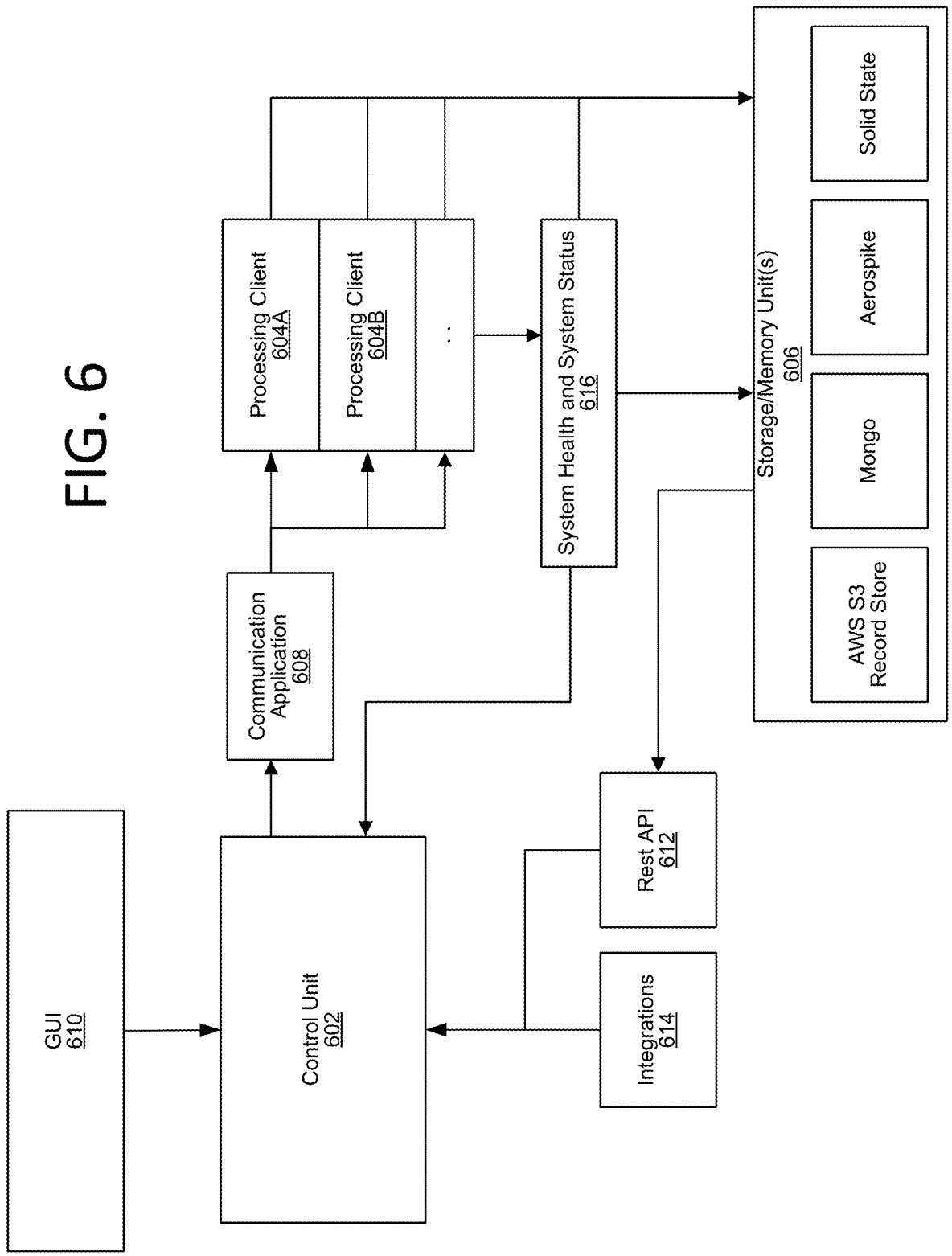
FIG. 6 illustrates an overview of a system architecture in accordance with one embodiment.

FIG. 6 illustrates an overview of a system architecture in accordance with one embodiment. The system can include a control unit 602, one or more processing clients/units 604A-

B, and one or more memory units 606. The control unit and the processing units may each be implemented using a computer, CPU or a specialized processor like a GPU. The memory units can be integrated with or be separate from the control and processing units. In the illustrated embodiment, the memory units can include, for example, an AWS S3 Record Store (cloud storage), a Mongo unit (memory mapped storage), an Aerospike unit (multilayer storage) and a solid state memory unit (flash memory). While specific memory units are provided for illustration, the disclosure is not limited to such and various other types of memory may be utilized in conjunction with or in place of the illustrated memory units.

The control unit can support a GUI 610 through which human user input and output can be transferred. The control unit can serve as a central control and command environment of the system. The control unit can act as a router between inbound request queues from the data inputs and the processing units. In one embodiment, the control unit is written in JavaScript with nodes such that the control unit is heavily extensible and designed for cutting edge horizontal scale to form a network, though other languages can be used.

A communication application 608 can provide communication between the control unit and the processing clients. ZeroMQ is shown as an illustrative communication application and facilitates low latency concurrent computing, however, other communication applications/software may be utilized.

Each processing unit can be or operate a multithreaded application which supports OpenMPI in conjunction with CUDA for mathematical processing in clustered environments. This software is meant to be extremely lightweight given requirements for computation, and it is also meant to be highly fault tolerant, redundant, and secure. The processing unit can have a communications socket, which can be part of the communication application. The communications socket can include, for example N number of threads listening for messages to add to a task queue. The task queue, in turn, can be processed by N number of threads and can be delegated across a cluster via OPENMPI. Each of these threads can pull from the queue and process tasks by event type.

The system can also include one or more data inputs. These data inputs can include, for example, a REST API 612 and integrations 614. The REST API can handle file uploads, data integration, triggering events or jobs, streamed post requests, and integration authentication. Although a REST API is illustrated, other forms of APIs may be utilized.

The control unit can also serve as an integration module for numerous types of integrations 614, such as integrations between third party software services. The integrations can include authentication and route configuration. For each integration, data can be ingested regardless of the underlying format or lack of it and the data can be mapped to an ontology as described herein. The integrations can have macro inserts of ontology inputs and outputs so formats can be mapped with human intervention when needed. This is especially useful when integrations have input and format variants.

The system can also include a system health and system status module 616 in communication with the control unit, the processing units and/or the memory units. The health and system status module can be configured to continuously monitor event processing queue lengths and system health. The status module can report status of the system to the control unit on a periodic basis or upon requests. The control unit can use reported system health information in delegation of tasks to processing units.

Data delegation amongst processing units can also be done based on model, speed, current queue size, geographical location, and physical distances of hardware powering a processing cluster. This allows for fine tuning super variables to ensure placement leans probabilistically with the correct processing nodes. This technology can extract unique features and assign probabilistic labels to them to probabilistically make sense of their function. This allows an extremely granular level of control when delegating to processing units.

FIG. 7 illustrates a schematic of processing unit health and status data that can be maintained by and/or communicated from/by each processing unit 604 to the system health and status module 616. Each processing unit can include a local heath and status module to monitor, collect, and/or communicate heath and status information to the system health and status module. Information, for example, on the number of threads in processing unit's queue and the processing unit availability and capacity can be transmitted to the system health and system status module 616, where it can be analyzed and provided to the control unit.

Detailed System Architecture

Figure 8A:
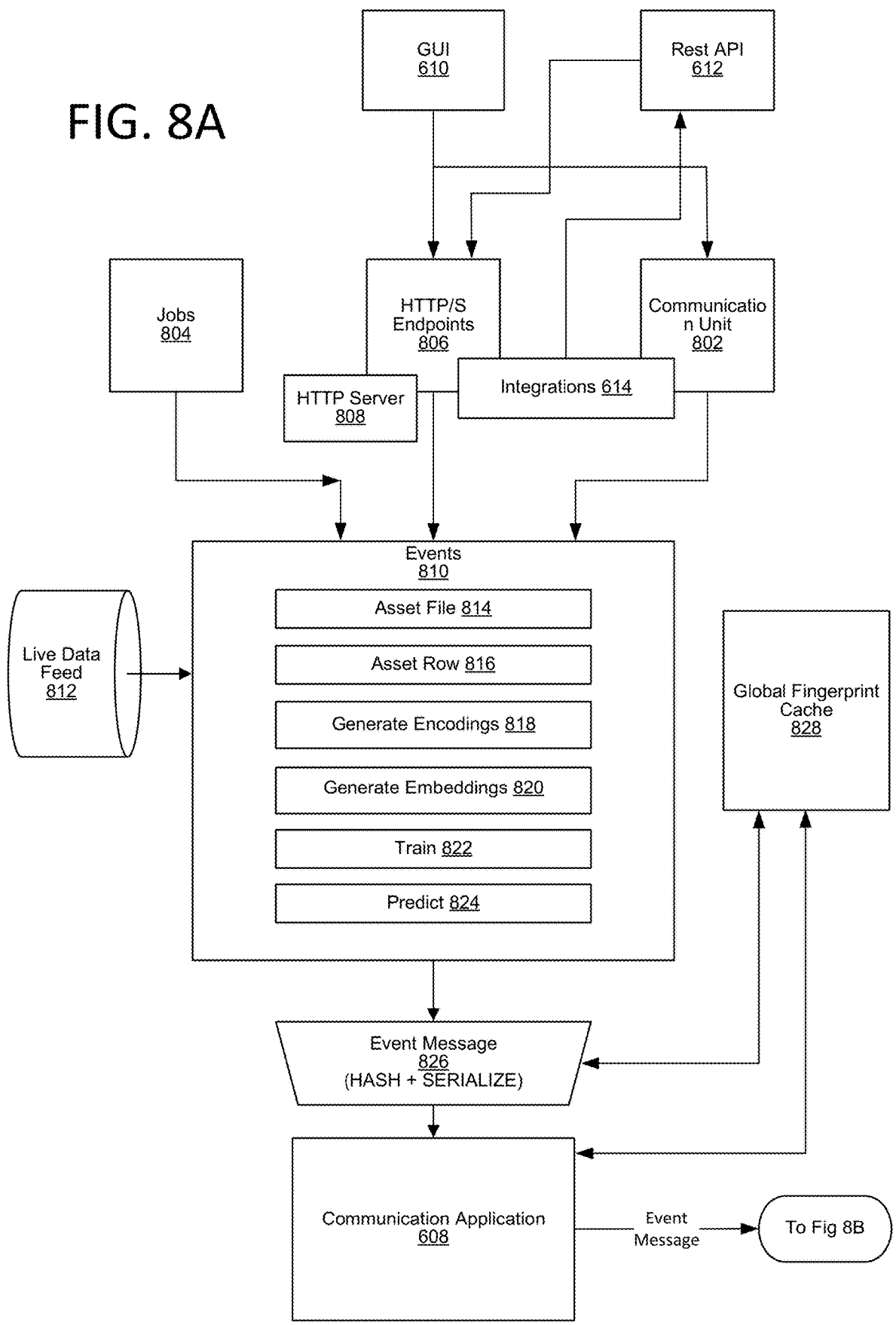
Figure 8B:
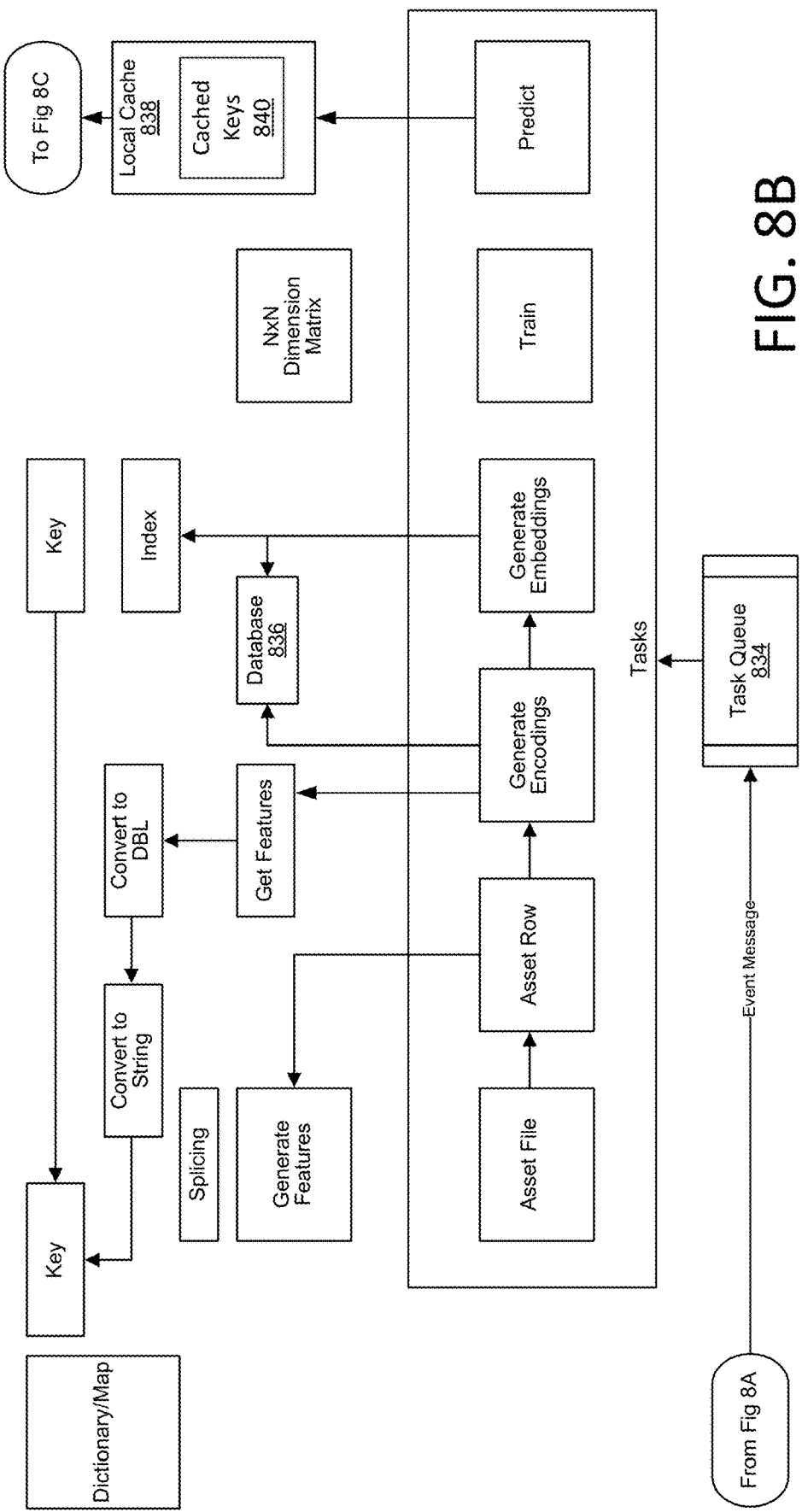

FIGS. 8A-C illustrate a detailed architecture and information flow diagram in accordance with one embodiment of the system. The functionality in FIG. 8A can generally be implemented on the control unit 602, whereas the functionality illustrated in FIGS. 8B-C can be implemented on each of the processing clients/units 604.

Referring to FIG. 8A, the control unit can receive information through the REST API 612 and/or the GUI 610. A communication unit 802 can be utilized to communicate between a front end and a back end of the system. The communication unit, which can be implemented e.g. using a web socket such as Socket I.O., may be utilized to direct jobs 804 within the control unit. Jobs can be created with macros and provide conditions to trigger workflows. An HTTP/S endpoint unit 806 can collect requests and serve responses via an HTTP Server 808 with the information utilized to generate events 810. The control unit can also receive a live data feed or stream 812 of incoming messages (which can be real time messages) or files, and the control unit initiates events 810 based on the feed. The incoming messages may be through, for example, any of JSON, ZeroMQ Socket, or REST API.

Events 810 can include various actions or tasks that the control unit sends to various processing units for execution. The various types of actions or tasks can each be associated with events, which can include but need not by limited to the following types: asset file 814, asset row 816, generate encodings 818, generate embeddings 8210, train 822, and predict 824. Each of these types of events will be discussed in additional detail below.

Events can be caught by a scalable thread pool dedicated to receiving events and adding them to an event stream to be picked up by processing units. Before being sent to a processing unit, data associated with the event is hashed and serialized into an event message 826. The creation of the event message can be done using a serialization library such as, for example, MessagePack, a technology used for serialization by CERN. The control unit then delegates the message to one of the processing units and sends the message through the communication application 608 to the selected processing unit.

The control unit can also include or maintain a global fingerprint cache 828. The global fingerprint cache stores traces of data being transferred between the control unit and the processing unit. This allows for faster seek time when seeking inferences on data previously seen or analyzed.

Referring to FIG. 8B, a processing unit receives event messages from the control unit. The events messages can be queued for processing as tasks in a task queue 834. As shown in FIG. 8B, the processing unit can execute tasks corresponding to various events identified by the control unit including: asset file 814, asset row 816, generate encodings 818, generate embeddings 8210, train 822, and predict 824.

An asset file task can be executed by one or more processing units to break an asset file down into a stream of asset rows, and the control unit can generate subsequent events for that stream of asset rows. An asset file represents messages or files received by the control unit for processing. An asset file task provides notification that there was a receive file message received by the control unit, and asset row events will follow. The asset file task can also include registering the content of asset rows with processing units. The registration of content can create a cache listing in the fingerprint cache indicating in which processing unit each row resides. This supports sharding of rows across processing units, and concurrent computation across clusters.

FIG. 9 illustrates a schematic showing the processing of an asset file 902 during an asset row task in response to an asset row event. Each processing unit receives rows with the last processing unit grabbing the remainder if needed. Each asset row 904 can be a dimensionalized piece of information associated to the asset file and can contain raw asset data. An asset row task can include receiving the asset row or chunk and fingerprinting its features. Features 906, which are high resolution fingerprints for identified data points, are distributed across processing units.

FIG. 10 is a schematic illustration showing the processing of an example asset row to identify features during an asset row task. In the example, the asset row includes the text "Hello user welcome to drainpipe" and the features are identified as "Hello", "user", "welcome", "to" and "drainpipe". For example, if the asset file is a .csv file, the row of "an Asset CSV" is received and is column separated by datapoints and labels. From there, features of uniqueness are extracted from the datapoint columns and are ready for encoding.

Referring again to FIG. 8B, once features have been identified, the process moves to the task of generate encodings. During the generate encodings task, an event is triggered to take original raw asset data and apply a process of converting the data into unique numerical representations. The encodings, which are generated for each feature are then stored in a database 836 (e.g. Aerospike), which can subsist in one of the memory units 606. Encodings on large files or a large amount of rows is a computationally heavy task and Aerospike provides efficient storage and retrieval. Other storage systems, however, may be utilized.

In the example of FIG. 10, the data point is a marked point of reference for sampling features containing raw data, which in this case is alpha text. The data is broken into individual features represented as doubles when encoded. The encodings are also converted into strings (e.g. from doubles) to be used as a string key in a map in the database allowing for fast lookups of encoded features. The overall map represented in the database is the dictionary of encoded features.

Referring again to FIGS. 8B and 8C, a generate embeddings task can create generationally trained representations of encoded sequences or column vectors 850 of features making up an asset or data point's raw data at a given timestamp and generation. These vectors are essentially time known fingerprints of a given datapoint with labels associated to them. This is a reality bound localized to a local cache 838 of the processing unit. In this task, the system can compress data as much as possible and break it into generational locally embedded indices for each unique feature known to a given processing unit's cache.

Every event which takes place has a time. Events in combination lead to situations. All events and situations are tied to a time. In order for events to have potential impact over a situation the time generation needs to intersect. To factor for such timing correlations, each array of encoded features representing raw data can be compressed in embeddings generationally and across cache loads.

The local cache 838 can include a max size configuration of last seen entry keys 840, which the processing unit writes to the cache. An entry key can be a unique hash corresponding to a unique object structure, for example, a text, a picture, a video. Hashing may be achieved utilizing various software, for example Opt Tree or Quad Tree. The uniqueness of the hash result is not impacted by the actual data contained, only by the structure. Upper-dimensional relatives of hashes can access lower dimensions for training, predicting, and testing.

During the process shown in FIG. 8, there may be pebibytes of data being processed off of even generally small files. While embedding, and prior to training, the system can create a generational fingerprint strand which contains a single column represented as an array in which each index to the array represents a unique encoding of a given feature in a generation's reality bounds 854 also known as the minimums and maximums of what the system knows.

Referring to FIG. 8C, a fingerprint strand (array) can be a bitmask 860 in which each index's value is either 1 or 0 depending on whether a fingerprint is contained in a given asset row of a column vector 850. These bitmasks can be extremely long arrays which are meant to signal if a given encoding of a feature is present absent loading the feature itself.

FIG. 11 is a schematic illustration showing an embedded asset feature matrix. Data length represents the length of raw data being submitted for training. The column vectors act as training rounds mapped to labels. Each processing unit may receive a row of a larger asset. The larger asset can be a training asset on examples of a base asset. For example, a larger asset may be a CSV file which is used in a training the model to label tweets or any other form of organized alpha text quickly and efficiently. Where the reality bound gets too large to represent as a matrix on a single machine, that data can be distributed and represented over an OpenMPI Cluster. Doing this makes the matrix manipulations capable of streaming real time across a cluster using a low latency serialization library used by CERN and an efficient socket library. This helps to facilitate timestamping the extreme expansion and then ultimate compression of data.

The results to these incoming requests based on parallel processed information can be provided in streams at the fastest speeds on the market today given the architecture and the control over processing units to be able to distribute payload and seek information in as little as O(1) hops for any given row or slice of bytes. Such a configuration allows the system to run full training ETL processes with very little process delay given branching of data to processing units and utilizing bare GPU and CUDA technology to transform matrices which in full size, cumulatively no computer currently available would be able to load.

Referring again to FIGS. 8B and 8C, a training task creates a model to represent this unique grouping of information in a feed forward style neural network with several layers and unique process variables. When training is called, two matrices can be generated; one for the training data, and one for the labels associated to the training data. The matrices can be encoded and compressed using a form spatial partitioning very similar to field of view and view of detail rendering components in video games.

FIG. 12 is a schematic view of a training matrix. The training matrix can be composed of X columns matching X number of rows from the grouping of bytes and Y rows for the number of features, where X and Y are contained within bounds.

In one embodiment, the model is a forward fed neural network using Mean Squared Error that has the layers arranged in the following order:
Identity Layer—No Explicit Input
Linear Layer—Reality Bound—R,C
LogSoftMax—No Explicit Input
Linear—Label Bound—C,R The model can use a stochastic gradient descent optimizer. Training merges correlatable features with each other. A label is a feature (with alpha text representation) correlatable to other features. The goal is to train and optimize the forward fed mean squared error to 0 to within a certain degree of precision at the completion of each training round.

In one example execution of a generational training round, the first two steps might produce results as follows:
Training Step 1: loss: 9.27748, error 18.555
Training Step 2: loss: 0.0126013; error 0.0252025
A round of training steps can be deemed complete once the error from a most recent step is within a predefined limit.

Referring again to FIGS. 8B and 8C, a predict task returns predictions of probabilities in an array where each index represents an identified label associated to the predictor matrix or data to be predicted against. Laying the array of labels associated to this hash against the result array allows mapping the results to correlating labels. The probabilities can be doubles.

The numbers below show what a prediction result could look like from a processing unit, where each row represents a different label. Negative values are unstable (widely unconfident), positive values closest to 0 are the closest to perfect, and 0 is a perfect prediction.
0.1411
0.5318
−1.2276
0.6577
−0.2982
−0.6272

Realtime messages can be sent to the processing unit communication framework using various technologies including JSON, RabbitMQ, ZeroMQ, Kafka Connectors, and the processing unit will directly respond with labels.

Upon an external system log, event, prediction request, or loggable integration request entry to the system, the processing unit looks to see if there are any entry keys which could match this information by running predict on the event log and associated data. In the event there are associated labels matching the event or raw data, the matching results are returned. If there are none or the results have unoptimized errors, then the generated log or event including prediction can be added to the training pool. As data comes in and events take place, as well as are scheduled through prediction triggers, stats and data play a key role in the most highly effective machine learning technologies.

Figure 13:
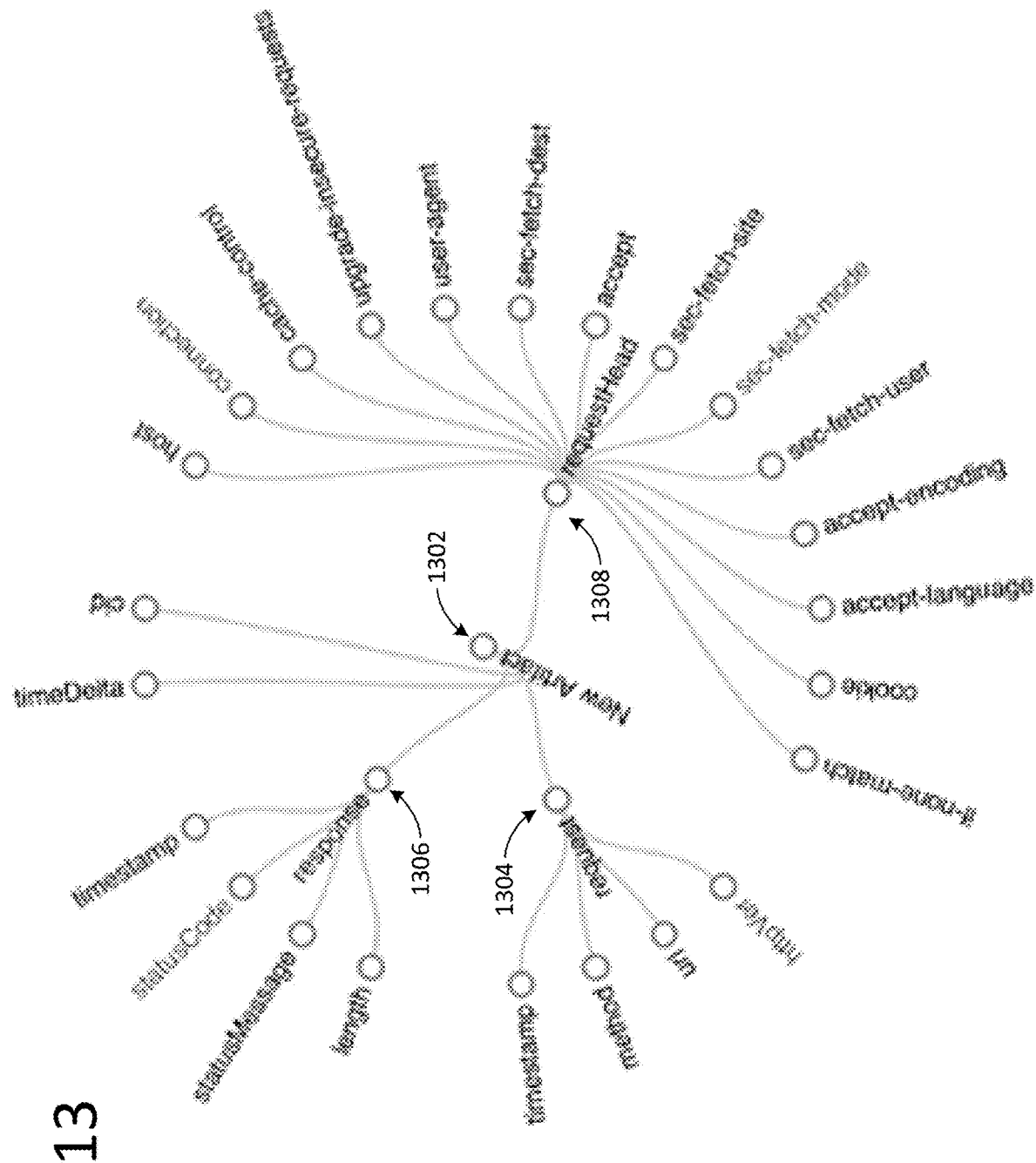
FIG. 13 illustrates an example of a user-driven process of manually associating training data with labels.

FIG. 13 illustrates an example of a user-driven process of manually associating training data with labels. In the illustrated example, the system has received an processed a new asset file which in this case is an HTTP Request coupled with an HTTP Response. The new asset file has been processed by the system's asset file, asset row, generate encodings and generate embeddings steps. Since the system or account may not have been previously trained to handle this type of data, the file has not been processed through either the train or predict tasks, and so the partially processed asset file can be considered to be an artifact. In the case that a predict task cannot classify a certain asset file or asset row to within a required or predefined degree of confidence, the system can identify the asset file or asset row as an artifact.

The artifact has associated attributes and datapoints identified by the system through the asset file, asset row, generate encodings and generate embeddings steps. As shown, the artifact 1302 is based on request data 1304, response data 1306 and environmental data 1308. The new artifact in this case is an HTTP Request coupled with an HTTP Response where the artifact has associated attributes and datapoints identified by the system where an Express.JS Middleware integration connection's resulting data is represented as a new artifact class.

Given an artifact, a user can manually modify the classes in the artifact, by renaming or reorganizing, to create an ontology, or the artifact can be incorporated into or used to modify an existing ontology.

The artifacts can be stored in the system's memory and tracked to maintain the current "evolution" of the artifacts. An evolution can be counted when the total number of artifacts has equaled the last generation's number of artifacts plus one. Evolutions can be representative of confidence depth given the amount of data applied, i.e. the more evolutions, the greater the confidence in the data and the associations thereof.

Computer Implementation

Components of the embodiments disclosed herein, which may be referred to as methods, processes, applications, programs, modules, engines, functions or the like, can be implemented by configuring one or more computers or computer systems using special purpose software embodied as instructions on a non-transitory computer readable medium. The one or more computers or computer systems can be or include one or more standalone, client and/or server computers, which can be optionally networked through wired and/or wireless networks as a networked computer system.

The special purpose software can include one or more instances thereof, each of which can include, for example, one or more of client software, server software, desktop application software, app software, database software, operating system software, and driver software. Client software can be configured to operate a system as a client that sends requests for and receives information from one or more servers and/or databases. Server software can be configured to operate a system as one or more servers that receive requests for and send information to one or more clients. Desktop application software and/or app software can operate a desktop application or app on desktop and/or portable computers. Database software can be configured to operate one or more databases on a system to store data and/or information and respond to requests by client software to retrieve, store, and/or update data. Operating system software and driver software can be configured to provide an operating system as a platform and/or drivers as interfaces to hardware or processes for use by other software of a computer or computer system. By way of example, any data created, used or operated upon by the embodiments disclosed herein can be stored in, accessed from, and/or modified in a database operating on a computer system.

Figure 14:
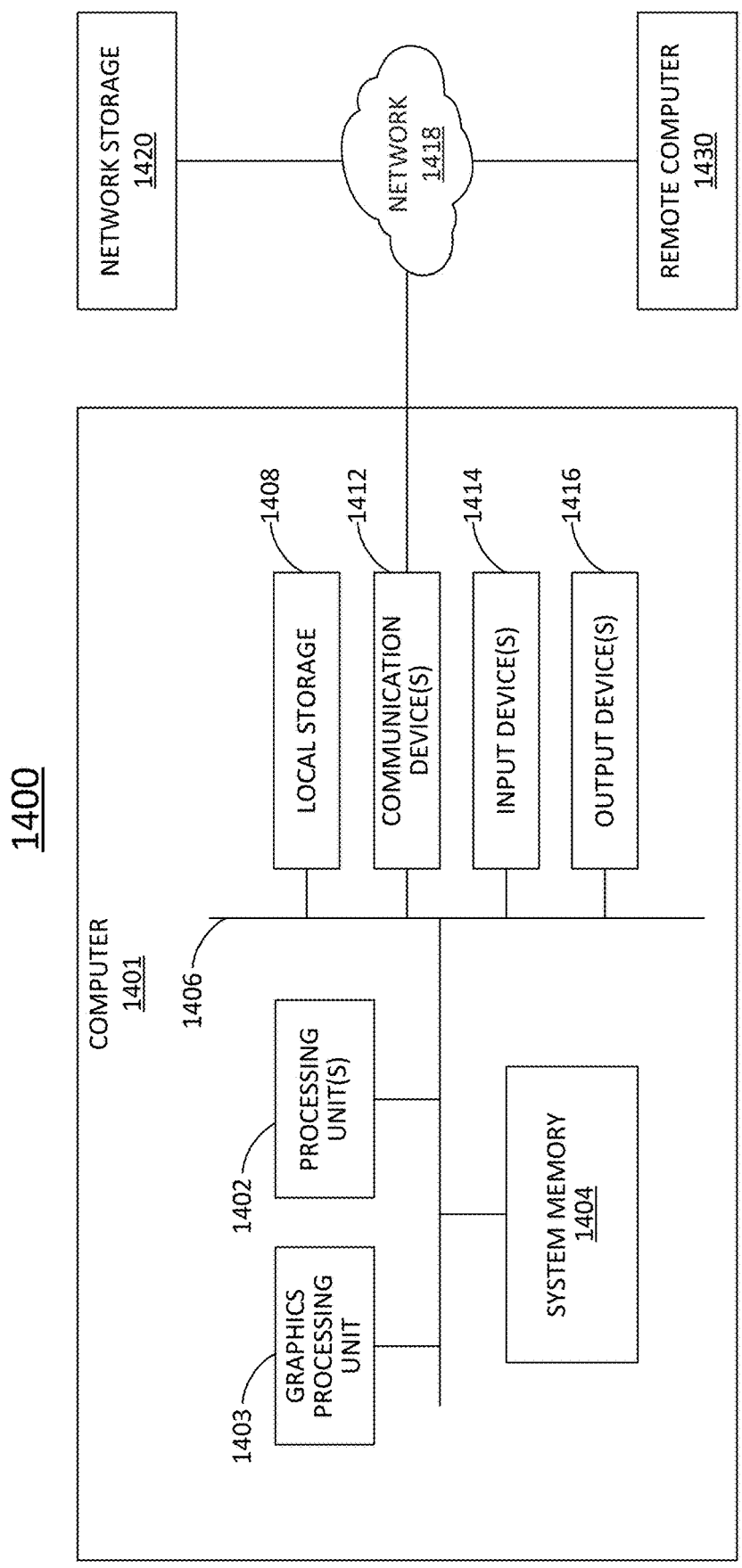
FIG. 14 illustrates a general computer architecture that can be appropriately configured to implement components disclosed in accordance with various embodiments.

FIG. 14 illustrates a general computer architecture 1400 that can be appropriately configured to implement components disclosed in accordance with various embodiments. The computing architecture 1400 can include various common computing elements, such as a computer 1401, a network 1418, and one or more remote computers 1430. The embodiments disclosed herein, however, are not limited to implementation by the general computing architecture 1400.

Referring to FIG. 14, the computer 1401 can be any of a variety of general purpose computers such as, for example, a server, a desktop computer, a laptop computer, a tablet computer or a mobile computing device. The computer 1401 can include a processing unit 1402, a system memory 1404 and a system bus 1406.

The processing unit 1402 can be or include one or more of any of various commercially available computer processors, which can each include one or more processing cores that can operate independently of each other. Additional co-processing units, such as a graphics processing unit 1403, also can be present in the computer.

The system memory 1404 can include volatile devices, such as dynamic random access memory (DRAM) or other random access memory devices. The system memory 1404 can also or alternatively include non-volatile devices, such as a read-only memory or flash memory.

The computer 1401 can include local non-volatile secondary storage 1408 such as a disk drive, solid state disk, or removable memory card. The local storage 1408 can include one or more removable and/or non-removable storage units. The local storage 1408 can be used to store an operating system that initiates and manages various applications that execute on the computer. The local storage 1408 can also be used to store special purpose software configured to implement the components of the embodiments disclosed herein and that can be executed as one or more applications under the operating system.

The computer 1401 can also include communication device(s) 1412 through which the computer communicates with other devices, such as one or more remote computers 1430, over wired and/or wireless computer networks 1418. Communications device(s) 1412 can include, for example, a network interface for communicating data over a wired computer network. The communication device(s) 1412 can include, for example, one or more radio transmitters for communications over Wi-Fi, Bluetooth, and/or mobile telephone networks.

The computer 1401 can also access network storage 1420 through the computer network 1418. The network storage can include, for example, a network attached storage device located on a local network, or cloud-based storage hosted at one or more remote data centers. The operating system and/or special purpose software can alternatively be stored in the network storage 1420.

The computer 1401 can have various input device(s) 1414 such as a keyboard, mouse, touchscreen, camera, microphone, accelerometer, thermometer, magnetometer, or any other sensor. Output device(s) 1416 such as a display, speakers, printer, or eccentric rotating mass vibration motor can also be included.

The various storage 1408, communication device(s) 1412, output devices 1416 and input devices 1414 can be integrated within a housing of the computer, or can be connected through various input/output interface devices on the computer, in which case the reference numbers 1408, 1412, 1414 and 1416 can indicate either the interface for connection to a device or the device itself as the case may be.

Any of the foregoing aspects may be embodied in one or more instances as a computer system, as a process performed by such a computer system, as any individual component of such a computer system, or as an article of manufacture including computer storage in which computer program instructions are stored and which, when processed by one or more computers, configure the one or more computers to provide such a computer system or any individual component of such a computer system. A server, computer server, a host or a client device can each be embodied as a computer or a computer system. A computer system may be practiced in distributed computing environments where operations are performed by multiple computers that are linked through a communications network. In a distributed computing environment, computer programs can be located in both local and remote computer storage media.

Each component of a computer system such as described herein, and which operates on one or more computers, can be implemented using the one or more processing units of the computer and one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct the processing unit to perform operations on data or configure the processor or computer to implement various components or data structures.

Components of the embodiments disclosed herein, which may be referred to as modules, engines, processes, functions or the like, can be implemented in hardware, such as by using special purpose hardware logic components, by configuring general purpose computing resources using special purpose software, or by a combination of special purpose hardware and configured general purpose computing resources. Illustrative types of hardware logic components that can be used include, for example, Field-programmable Gate Arrays (FPGAs), Application-specific Integrated Circuits (ASICs), Application-specific Standard Products (ASSPs), System-on-a-chip systems (SOCs), and Complex Programmable Logic Devices (CPLDs).

Conclusion

Although the subject matter has been described in terms of certain embodiments, other embodiments that may or may not provide various features and aspects set forth herein shall be understood to be contemplated by this disclosure. The specific embodiments set forth herein are disclosed as examples only, and the scope of the patented subject matter is defined by the claims that follow.

In the claims, the terms "based upon" and "based on" shall include situations in which a factor is taken into account directly and/or indirectly, and possibly in conjunction with other factors, in producing a result or effect. In the claims, a portion shall include greater than none and up to the whole of a thing; encryption of a thing shall include encryption of a portion of the thing. In method claims, any reference characters are used for convenience of description only, and do not indicate a particular order for performing a method.

The invention claimed is:

1. A method performed by a computer system having at least one processor and a memory, the method comprising, the computer system:
   maintaining in the memory a hierarchical ontology of classes for classifying input data;
   receiving a first asset file of data to be classified into the ontology;
   breaking down the first asset file into a first plurality of asset rows;
   for each asset row of the first plurality of asset rows:
   extracting one or more features from the asset row, encoding each of the one or more features, and embedding each encoded feature with a generational time stamp;
   displaying one or more of the features extracted from the first plurality of rows as artifacts within at least a portion of the ontology in a hierarchical representation in a graphical user interface;
   in response to user input received through the graphical user interface, modifying the ontology by adding a new class and associating one or more of the artifacts with the new class;
   executing a train task to train a statistical model based on the embedded encoded features extracted from the first plurality of rows, the modified ontology, and the association of the one or more of the artifacts with the new class;
   receiving a second asset file of data to be classified into the ontology;
   breaking down the second asset file into a second plurality of asset rows;
   for each asset row of the second plurality of asset rows:
   extracting one or more features from the asset row, encoding each of the one or more features, and embedding each encoded feature with a generational time stamp; and
   executing a predict task to apply the statistical model to associate embedded encoded features extracted from the second plurality of rows with classes in the modified ontology.

2. The method of claim 1, further comprising:
   creating column vectors of features representing generationally trained representations of encoded features associated with a generational time stamp.

3. The method of claim 2, further comprising:
   creating a generational fingerprint strand comprising an array in which each index to the array represents a unique encoding of one or more features for a generational time stamp.

4. The method of claim 1, wherein each of the first asset file and the second asset file are received through one or more of JSON, ZeroMQ Socket, and a REST API.

5. The method of claim 1, wherein the train task comprises grouping encoded embeddings in a feed forward neural network.

6. The method of claim 5, wherein train task further comprises:
   generating a first matrix for training data; and
   generating a second matrix for labels associated to the training data.

7. The method of claim 1, wherein the statistical model includes a stochastic gradient descent optimizer.

8. A computer system comprising at least one processor and a memory storing instructions that cause the computer system to perform a method comprising:
   maintaining in the memory a hierarchical ontology of classes for classifying input data;
   receiving a first asset file of data to be classified into the ontology;
   breaking down the first asset file into a first plurality of asset rows;
   for each asset row of the first plurality of asset rows:
   extracting one or more features from the asset row, encoding each of the one or more features, and embedding each encoded feature with a generational time stamp;
   displaying one or more of the features extracted from the first plurality of rows as artifacts within at least a portion of the ontology in a hierarchical representation in a graphical user interface;
   in response to user input received through the graphical user interface, modifying the ontology by adding a new class and associating one or more of the artifacts with the new class;
   executing a train task to train a statistical model based on the embedded encoded features extracted from the first plurality of rows, the modified ontology, and the association of the one or more of the artifacts with the new class;
   receiving a second asset file of data to be classified into the ontology;
   breaking down the second asset file into a second plurality of asset rows;
   for each asset row of the second plurality of asset rows:
   extracting one or more features from the asset row, encoding each of the one or more features, and embedding each encoded feature with a generational time stamp; and
   executing a predict task to apply the statistical model to associate embedded encoded features extracted from the second plurality of rows with classes in the modified ontology.

9. The computer system of claim 8, wherein the method further comprises:
   creating column vectors of features representing generationally trained representations of encoded features associated with a generational time stamp.

10. The computer system of claim 9, wherein the method further comprises:
    creating a generational fingerprint strand comprising an array in which each index to the array represents a unique encoding of one or more features for a generational time stamp.

11. The computer system of claim 8, wherein each of the first asset file and the second asset file are received through one or more of JSON, ZeroMQ Socket, and a REST API.

12. The computer system of claim 8, wherein the train task comprises grouping encoded embeddings in a feed forward neural network.

13. The computer system of claim 12, wherein train task further comprises:
    generating a first matrix for training data; and
    generating a second matrix for labels associated to the training data.

14. The computer system of claim 8, wherein the statistical model includes a stochastic gradient descent optimizer.

15. A non-transitory computer readable medium having instructions stored thereon, wherein the instructions, when executed by a computer system having at least one processor, cause the computer system to perform a method comprising:

maintaining in the memory a hierarchical ontology of classes for classifying input data;
receiving a first asset file of data to be classified into the ontology;
breaking down the first asset file into a first plurality of asset rows;
for each asset row of the first plurality of asset rows:
extracting one or more features from the asset row, encoding each of the one or more features, and embedding each encoded feature with a generational time stamp;
displaying one or more of the features extracted from the first plurality of rows as artifacts within at least a portion of the ontology in a hierarchical representation in a graphical user interface;
in response to user input received through the graphical user interface, modifying the ontology by adding a new class and associating one or more of the artifacts with the new class;
executing a train task to train a statistical model based on the embedded encoded features extracted from the first plurality of rows, the modified ontology, and the association of the one or more of the artifacts with the new class;
receiving a second asset file of data to be classified into the ontology;
breaking down the second asset file into a second plurality of asset rows;
for each asset row of the second plurality of asset rows:
extracting one or more features from the asset row, encoding each of the one or more features, and embedding each encoded feature with a generational time stamp; and
executing a predict task to apply the statistical model to associate embedded encoded features extracted from the second plurality of rows with classes in the modified ontology.

16. The computer readable medium of claim 15, wherein the method further comprises:
creating column vectors of features representing generationally trained representations of encoded features associated with a generational time stamp.

17. The computer readable medium of claim 16, wherein the method further comprises:
creating a generational fingerprint strand comprising an array in which each index to the array represents a unique encoding of one or more features for a generational time stamp.

18. The computer readable medium of claim 15, wherein each of the first asset file and the second asset file are received through one or more of JSON, ZeroMQ Socket, and a REST API.

19. The computer readable medium of claim 15, wherein the train task comprises grouping encoded embeddings in a feed forward neural network.

20. The computer readable medium of claim 19, wherein train task further comprises:
generating a first matrix for training data; and
generating a second matrix for labels associated to the training data.

* * * * *